US011506551B2

(12) United States Patent
Engström et al.

(10) Patent No.: US 11,506,551 B2
(45) Date of Patent: Nov. 22, 2022

(54) METHOD AND APPARATUS FOR DYNAMOMETER TESTING OF A MOTOR VEHICLE

(71) Applicant: ROTOTEST INTERNATIONAL AB, Rönninge (SE)

(72) Inventors: Christian Engström, Tyresö (SE); Nils G. Engström, Rönninge (SE); Jonny Färnlund, Skärholmen (SE)

(73) Assignee: ROTOTEST INTERNATIONAL AB, Rönninge (SE)

( * ) Notice: Subject to any disclaimer, the term of this patent is extended or adjusted under 35 U.S.C. 154(b) by 168 days.

(21) Appl. No.: 16/967,157

(22) PCT Filed: Jan. 31, 2019

(86) PCT No.: PCT/SE2019/050079
§ 371 (c)(1),
(2) Date: Aug. 4, 2020

(87) PCT Pub. No.: WO2019/151934
PCT Pub. Date: Aug. 8, 2019

(65) Prior Publication Data
US 2020/0363277 A1    Nov. 19, 2020

(30) Foreign Application Priority Data

Feb. 5, 2018   (SE) .................................... 1850126-2
May 31, 2018  (SE) .................................... 1850659-2

(51) Int. Cl.
*G01L 3/00*    (2006.01)
*G01L 3/10*    (2006.01)
(52) U.S. Cl.
CPC .................................... *G01L 3/108* (2013.01)
(58) Field of Classification Search
CPC ....... G01L 3/108; G01L 3/00; G01M 17/0074
See application file for complete search history.

(56) References Cited

U.S. PATENT DOCUMENTS 4,185,495 A      1/1980  Rauch et al.
4,669,318 A  *   6/1987  Angstrom .......... G01M 17/0072
                                                    73/862.14
(Continued)

FOREIGN PATENT DOCUMENTS

WO    2012053966 A1    4/2012
WO    2015152804 A1   10/2015

OTHER PUBLICATIONS

International Search Report and Written Opinion in corresponding International Application No. PCT/SE2019/050079 dated Feb. 19, 2019 (11 pages).

*Primary Examiner* — Max H Noori
(74) *Attorney, Agent, or Firm* — Jeffri A. Kaminski; Venable LLP (57) ABSTRACT

A dynamometer test unit configured for use in a vehicle dynamometer system for dynamometer testing of a vehicle, the dynamometer test unit being configured to be connected to a wheel shaft of a vehicle, the dynamometer test unit comprising a power source having a stator and a rotor and being configured to, during testing, apply torque to a wheel shaft of the vehicle being tested, the power source being carried by a stator support, the stator being journaled in relation to the stator support, the dynamometer test unit further comprising means for measuring torque comprising an elastic strip, wherein the elastic strip connects the stator to the stator support, thereby restraining relative rotational movement between stator and stator support, and configured to transfer force between the stator and stator support, the elastic strip being firmly secured in a manner such that it is subjected to homogenous tensile prestress in a longitudinal direction of the elastic strip.

19 Claims, 7 Drawing Sheets

(56) References Cited

U.S. PATENT DOCUMENTS

| | | | |
|---|---|---|---|
| 5,078,008 A | 1/1992 | Yagi et al. | |
| 5,167,148 A * | 12/1992 | Black | G01L 5/28 |
| | | | 73/862.13 |
| 5,663,494 A * | 9/1997 | Clayton, Jr | G01L 3/22 |
| | | | 73/862.17 |
| 2005/0147337 A1 | 7/2005 | Ostling et al. | |
| 2016/0308484 A1* | 10/2016 | Engström | H02H 9/041 |
| 2017/0176293 A1* | 6/2017 | Engstrom | G01L 3/16 |

* cited by examiner

METHOD AND APPARATUS FOR DYNAMOMETER TESTING OF A MOTOR VEHICLE

CROSS-REFERENCE TO RELATED APPLICATIONS

This application is a U.S. National Stage application of PCT/SE2019/050079, filed Jan. 31, 2019 and published on Aug. 8, 2019 as WO/2019/151934, which claims the benefit of Swedish Patent Application Nos. 1850126-2, filed Feb. 5, 2018, and 1850659-2, filed May 31, 2018, all of which are hereby incorporated by reference in their entireties.

FIELD OF THE INVENTION

This invention relates to dynamometer testing of vehicles, and in particular to a dynamometer test unit for use when dynamometer testing vehicles having at least one wheel shaft and a power source for applying power to said first wheel shaft. The invention also relates to an assembly method for assembling such a dynamometer test unit.

BACKGROUND OF THE INVENTION

Dynamometer testing of vehicles is known per se, and can, for example, be carried out by roller type (rolling road) dynamometers equipped with large rollers that support the vehicle wheels, and which are used to apply a brake torque to the drive wheels of the vehicle. The rollers are in general of a friction type, where the dynamometer system is engaged by friction engagement with the tyres of the driven vehicle wheels. Unavoidable and oftentimes also unpredictable and variable slipping and friction between the tyres and the friction rollers may cause undesirable inaccuracies in the test result.

Systems of the friction roller kind also may not always be capable of providing the desired measurement accuracy and/or degree of freedom of measurement.

Another kind of vehicle dynamometer systems utilize an apparatus for dynamometer testing of vehicles, where load absorbing means e.g. in the form of a hydrostatic pump assembly has an input shaft for engagement with a drive shaft of a vehicle to be tested. Each drive shaft of the vehicle may be fixedly connected to an individual apparatus of this kind, whereby a total effective torque from the vehicle can be accurately measured.

Systems of this kind may be utilized to perform complex tests both in regard of two-wheel drive systems, and also in regard of four, or more, wheel drive systems. Also, vehicle transmissions may include various kinds of, and also a plurality of, power sources for providing power to wheel shafts of the vehicle. These power sources may be arranged to provide propelling powers, and also braking powers, e.g. when used for regenerative braking. The increased complexity of vehicle transmissions provides a desire to also be able to test further functionality using dynamometer testing systems. In addition, vehicles are increasingly equipped with driver assistance systems, where such systems may be utilized to aid the driver in various situations.

The increased complexity of vehicle control systems may require testing in an extensive number of real-life driving situations and conditions to ensure the desired functionality. It would be desirable if at least part of such real-life driving tests may be exchanged for tests using vehicle dynamometers.

Aim and Most Important Features of the Invention

It is an object of the present invention to provide a vehicle dynamometer allows accurate testing of vehicle functionality also when the conditions prevailing during testing may vary from one test to another.

According to the present invention, it is provided a dynamometer test unit configured for use in a vehicle dynamometer system for dynamometer testing of a vehicle, the dynamometer test unit being configured to be connected to a wheel shaft of a vehicle to be tested, the dynamometer test unit comprising a power source having a stator and a rotor and being configured to, during testing, apply torque to a wheel shaft of the vehicle being tested, the power source being carried by a stator support, the stator being journaled in relation to the stator support. The dynamometer test unit comprises means for measuring torque comprising an elastic strip, wherein the elastic strip connects the stator to the stator support, thereby restraining relative rotational movement between stator and stator support, and configured to transfer force between the stator and stator support, the elastic strip being firmly secured in a manner such that it is subjected to homogenous tensile prestress in a longitudinal direction of the elastic strip.

The elastic strip may be an elongated elastic strip.

The dynamometer test unit may form part of a vehicle dynamometer system comprising one or more dynamometer test units.

The stator support may comprise a ground engaging support configured to allow the dynamometer test unit to be standing freely on a surface, such as e.g. a floor of the location in which testing is being performed.

The ground engaging support may prevent the dynamometer test unit from rotating when subjected to torque thereby withstanding the torque that the dynamometer test unit is subjected to.

The use of systems where one or more dynamometer test units comprising a power source are connected to wheel shafts of a vehicle are capable of providing accurate measurement results when testing vehicles. For example, vehicles can be tested during rapid accelerations, and wheel torque throughout the vehicle engine speed range can be measured in an accurate manner. In general, torque/load can be arranged to be measured by measurement means measuring directly on the shaft being tested. Such measurements, however, face difficulties e.g. with regard to rotating parts etc. Alternatively, the torque load applied on a rotating shaft can be measured, as in the present invention, by measuring a reaction load. Measurements of reaction load/torque uses the fact that for every action there is an equal and opposite reaction. With regard to dynamometer measurements this means that the load/torque can be measured by measuring the amount of load/torque that is required to prevent, in this case, the dynamometer test unit, from turning. This load is commonly called the reaction load, or reaction torque. This is also the torque that is measured according to the invention.

As was mentioned, the stator is journaled in relation to the stator support, and hence the stator, and thereby the power source including stator housing, is rotatable in relation to the stator support. The rotational movement is then restricted by the, e.g. elongated, elastic strip that connects the stator to the stator support. When a torque is applied to the dynamometer test unit, the power source is prevented from rotating through the elastic strip, which then transfers the torque that the stator is subjected to from stator to stator support, the strip forming a tensile-force transmitting link between the stator and the stator support.

The elastic strip forms part of means for measuring the torque that the dynamometer test unit is subjected to since the elastic strip is also subjected to this torque.

The torque may be measured by measuring tensile stress that the elastic strip is subjected to.

In order to measure tensile stress that the elastic strip is subjected to, the elastic strip is subjected to a tensile prestress. The stress-strain curve of a material in general has a proportional portion where the material is strained in proportion to the applied force. The prestress may be controlled to a level on the stress-strain curve being in this proportional portion to ensure that the resulting strain is proportional to the applied force.

The strip may be prestressed to a stress level that is sufficiently high to ensure that the strip will not be completely relieved from stress, which may have the result that the strip may buckle. The strip may also be prestressed to a stress level that is sufficiently high to ensure that the strip will not be or leave a proportional area of the stress-strain curve when subjected to the torques for which the dynamometer test unit is designed.

According to the invention, the elastic strip is subjected to a homogenous tensile prestress in a longitudinal direction of the elastic strip. This has the advantage that material properties will be the same in the elastic strip, and the strip thereby react to temperature changes in a homogenous manner. In this way, temperature variations will not affect measurement results in other way than can easily be compensated for e.g. by the coefficient of expansion. In case the strip would not be subjected to homogenous tensile prestress, but instead a prestress that varies with the position along the strip, which in general is the case, the material will be differently affected by the variations in temperature, and thereby difficult to compensate for.

With regard to the elastic strip this is formed by high-strength steel to support the high torques that the strip may be subjected to. Hence the strip is elastic according to the physics definition, i.e. the ability of a body to resist a distorting influence and to return to its original size and shape when that influence or force is removed.

Exemplary dimensions of the elastic strip are 15-30 cm in length, 3-7 cm in width, although other dimensions may be suitable e.g. in dependence on the level of torques to be absorbed.

According to embodiments of the invention, the elastic strip may be subjected to homogenous tensile prestress in the longitudinal direction of the elastic strip in a manner such that the elastic strip is subjected to the homogenous tensile prestress also when firmly secured to the stator support but released from the stator, or vice versa. That is, the elastic strip maybe firmly secured such that the prestress is applied already prior to the strip being secured to both stator support and stator.

According to embodiments of the invention both ends of the, e.g. elongated, elastic strip may be firmly secured to either of the stator or stator support, and wherein a portion in between the ends of the elastic strip is firmly secured to the other of the stator or stator support. Still the elastic strip is firmly secured such that when both ends are firmly secured to the stator or stator support it is subjected to tensile prestress in the longitudinal direction of the elastic strip also when the portion in between is released from the other of the stator or stator support.

According to embodiments of the invention, the elastic strip is subjected to a tensile prestress at least corresponding to the stress the elastic strip being subjected to when said dynamometer test unit absorbs a first predetermined torque, where the first predetermined torque is a torque that the dynamometer test unit is designed to, during testing, at most absorb and/or apply to the vehicle wheel shaft. This may e.g. be the maximum torque that the power source of the dynamometer test unit is capable to deliver.

According to embodiments of the invention, both ends of the elastic strip are connected to the stator support, and wherein a center portion of the elastic strip is firmly secured to the stator.

The tensile prestress of the strip may be accomplished by the action of a force acting in the longitudinal direction of the strip during assembly following the strip being secured at one end to one of the stator or the stator support to then be subjected to said force while the other end being secured to said one of the stator or stator support. In this way the strip will become homogenously prestressed.

The torque measuring means may further comprise at least one pair of strain gauges being secured to the elastic strip, the strain being measured by measuring a relative difference in resistance imposed in the strain gauges caused by strain of the strip while the dynamometer test unit is subjected to torque.

The end portions of the strip may be firmly secured to either one of the stator and stator support and its central portion may be firmly secured to the other of the stator and stator support. A first pair of strain gauges may be secured to the strip on one side of the central strip portion and a second pair of strain gauges may be secured to the strip on the other side of the central strip portion. The strain gauges being connected in an electrical measuring bridge circuit, such as a Whetstone bridge, and the force acting on the strip may be measured by measuring a relative difference in resistance caused by strain of the strip while torque is applied to the dynamometer test unit. One side of the strip in relation to the central strip portion will be subjected to reduced stress, while the other side is subjected to increased stress, the difference in stress resulting in a difference in resistance of the strain gauges being proportional to the applied force and thereby proportional to the torque the dynamometer test unit is being subjected to.

The stator may be supported by the stator support through the use of a tubular stator member forming e.g. part of a stator housing of the stator and being journaled for rotational movement relative to the stator support by a bearing assembly comprising at least two antifriction bearings.

Further, the dynamometer test unit output shaft may be journaled for rotation relative the stator using antifriction bearings being located within and concentrically with the tubular stator member.

The bearing assembly may be arranged at or towards the end of the stator support that during testing face the vehicle to be tested, wherein the greater portion of the power source extend in cantilever fashion from the bearing assembly towards the opposite side of the stator support while being carried by the bearing assembly.

A ground support may be configured to prevent the dynamometer test unit from tilting backwards when not attached to a vehicle.

According to embodiments of the invention at least two parallel elastic strips connect the stator to the stator support, thereby restraining relative rotational movement between stator and stator support, the at least two parallel strips being configured to transfer force between the stator and stator support. In this way, the dynamometer test unit may be designed to absorb higher levels of torque.

The method can be performed in a vehicle dynamometer system where the dynamometer test units are of a kind having an electrical machine as power source.

The dynamometer test units may also have controllable hydraulic pumps for controlled braking so as to apply a braking torque to wheel shafts of a motor vehicle during the testing process.

The support means contacting the surface upon which the dynamometer test unit is resting may comprise wheels, such as e.g. swivel or caster wheels, but may also comprise any other suitable means that allow movement of the dynamometer test unit on the surface upon which it is resting according to the invention. The support means may be designed to provide a relatively low friction against motion of the dynamometer test units to facilitate movement according to the invention.

During dynamometer testing, the speed of rotation of the output shaft of the dynamometer test unit may be detected using any suitable sensor. According to embodiments of the invention, in addition to determining the speed of rotation, the rotation position may also be determined. For example, the shaft angular position can be determined using suitable position determining means, such as one or more appropriate encoders being utilized to detect the rotational position of the output shaft. For example, the shaft position determining means may comprise one or more absolute rotary encoders, one or more optical encoders, one or more hall effect sensors or any other suitable sensor means to determine to determine the speed of rotation and angular position.

The torque may be determined using said means for measuring torque e.g. at a high sampling rate, such as e.g. 100-100 000 times a second. The determined torque may then be correlated with the current rotation angle of the dynamometer output shaft/wheel shaft, which may be determined with a corresponding resolution. That is, for each torque value the current rotation position may be determined for the very instant the torque value is determined, respectively. The correlated values may then be utilized e.g. to determine whether certain shaft angles of rotation give rise to divergent torque measurements. For example, in case the dynamometer test unit has not been properly set up, e.g. with regard to alignment with the wheel shaft, the dynamometer test unit may exhibit undesired vibrations that may impact the torque measurements. The correlation of angle of rotation of the shaft with corresponding torque measurement may be utilized to detect such anomalies as well as others.

Furthermore, there may exist a desire to measure the yaw moment that the dynamometer test unit is subjected to when subjected to a turning motion about the yaw axis, i.e. a substantially vertical axis, such as when the vehicle steering mechanism performs a wheel hub turning motion, e.g. by the vehicle steering wheel being turned, to thereby turn the dynamometer test unit instead of a vehicle wheel.

According to embodiments of the invention, the strip may be utilized also for measurements of this kind. In this case, in addition to measuring strain in a longitudinal direction of e.g. an elongated strip, the strain that the strip is subjected to may also be measured in the transversal direction, and where the yaw moment may be determined from this strain. Similar to what has been described with regard to torque measurements above, a turning motion of the dynamometer test unit will rise to a yaw moment (torque) which will have the result that the strip will be subjected to different levels of stress on either side of e.g. a middle portion of the strip being attached to the stator or stator support. The differences in strain on the strip can be detected and utilized to determine the yaw moment that the dynamometer test unit is subjected to when being turned, e.g. by a turning of the vehicle steering wheel.

According to embodiments of the invention, both the strain in the longitudinal direction as well as the strain in the transversal direction are utilized when determining the yaw moment that the dynamometer test unit is subjected to.

According to embodiments of the invention, in addition, torque measurement means may be provided e.g. in a bearing housing supporting the dynamometer test unit power source to measure the bending moment that the bearings are subjected to when the dynamometer test unit is turned e.g. by the vehicle steering mechanism. The bending moment that the bearings are subjected to may then be utilized to determine the yaw moment that the dynamometer test unit is subjected to.

The dynamometer test unit may also be of a kind having two (or more) dynamometer power sources for providing power to a same wheel shaft, such as e.g. a half shaft, of the vehicle, where one of said power sources can be an electrical machine.

Further features of the present invention and advantages thereof will become clear from the following detailed description of illustrative embodiments and from the attached drawings.

BRIEF DESCRIPTION OF DRAWINGS

The invention will now be described in greater detail with reference to the drawings, wherein.

DESCRIPTION OF EXEMPLARY EMBODIMENTS

Figure 1:
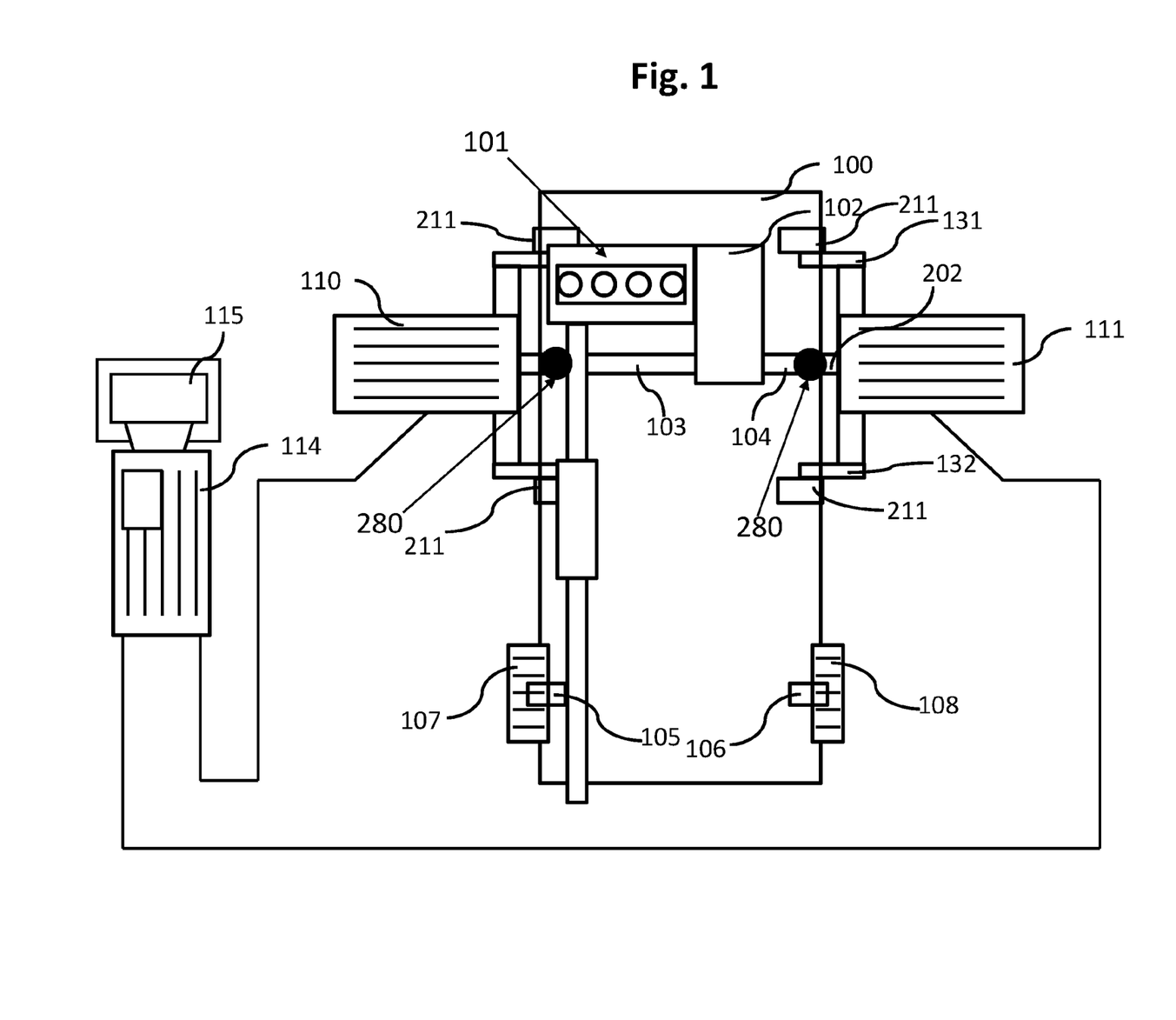
FIG. 1 illustrates an exemplary vehicle dynamometer system according to embodiments of the invention comprising two dynamometer test units being connected to driven wheel shafts of a vehicle.

FIG. 1 discloses a vehicle 100 set up for being tested with a vehicle dynamometer system comprising dynamometer test units according to embodiments of the invention.

The disclosed vehicle 100 is a two-wheel (front wheel) drive vehicle, and includes front axle wheel shafts, or half shafts, 103, 104, and rear axle wheel shafts 105, 106.

The disclosed vehicle 100 further includes a drive train, which according to the present example includes a combustion engine 101 connected to a gearbox 102. The gearbox 102 may be of any suitable kind and, e.g., consist of a manual transmission or an automatic transmission. There may also be no transmission, e.g. if the vehicle is an electric vehicle having one or more electric motors that directly power wheel shafts of the vehicle. The particular drivetrain of the vehicle 100 is for illustration purposes only. The front axle wheel (drive) shafts, such as half shafts, 103, 104 extend from the gearbox to the front axle wheels of the vehicle 100. FIG. 1 only discloses rear axle wheels 107, 108, whereas the front axle wheels have been removed to allow dynamometer test units 110, 111 to be rigidly connected to the half shafts 103, 104 in place of the wheels according to the below.

The vehicle dynamometer system connected to the vehicle 100 hence comprises two basically identical dynamometer test units 110, 111. The dynamometer test units 110, 111 are connected to a measuring and control system 114, such as e.g. a computer with associated display 115, by means of which e.g. tests may be controlled, and by means of which an operator of the system e.g. may initiate tests and provide necessary information for performing the dynamometer tests.

During testing, the measuring and control system 114 may transmit control signals to the dynamometer test units 110, 111 to request desired load (torque) and possibly desired speed of rotation to be applied to half shafts 103, 104, respectively. Measurement of the torque according to embodiments of the invention will be described below. The dynamometer test units 110, 111 may consist of substantially identical test units, and are described more in detail with reference to FIGS. 2-5.

The following description is only directed to dynamometer test unit 110 but is, as is realized, equally applicable to dynamometer test unit 111.

Figure 2:
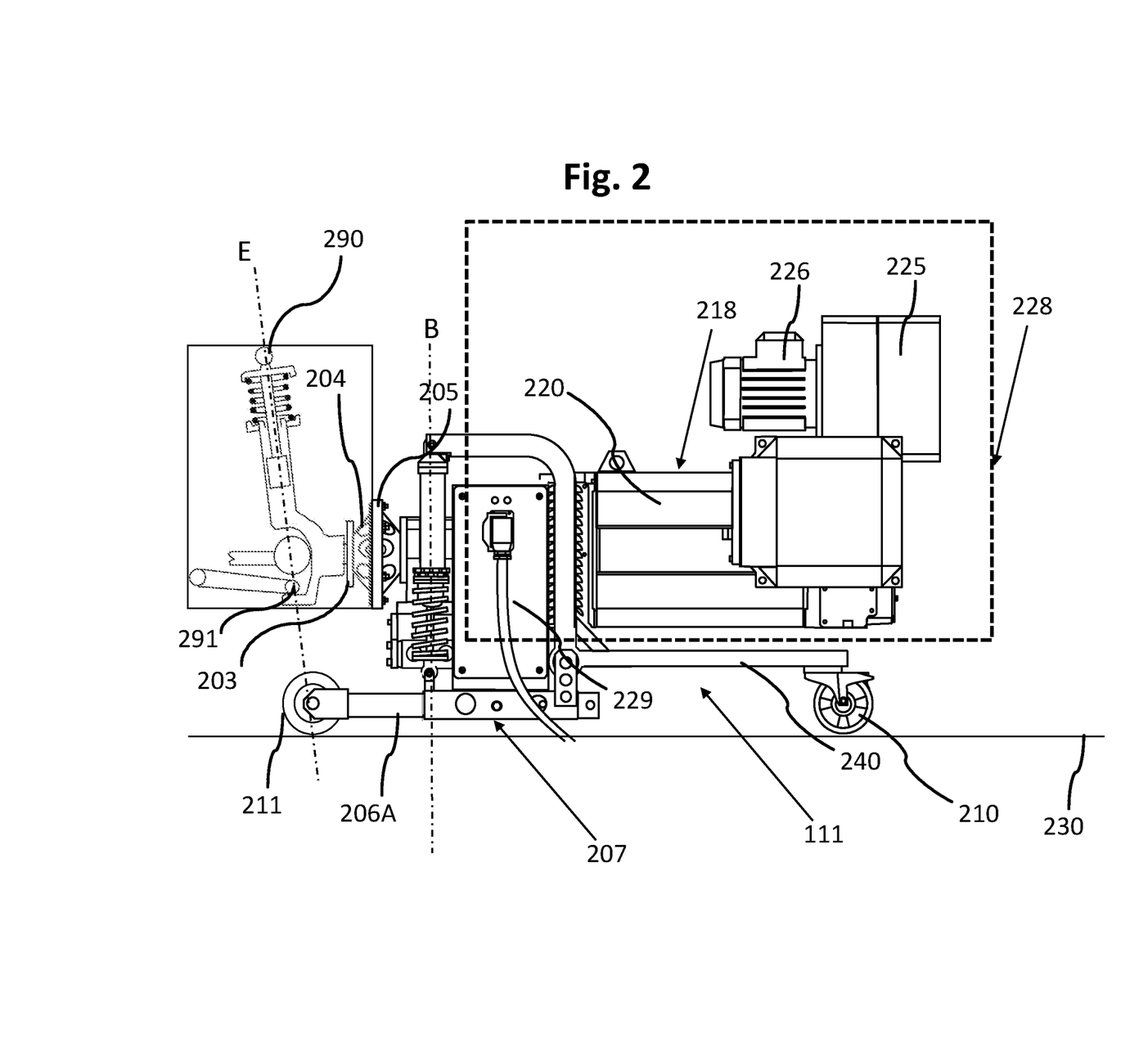
FIG. 2 illustrates schematically a lateral view of the dynamometer test unit of the system disclosed in FIG. 1.

FIG. 2 illustrates a lateral view of one of the dynamometer test units, e.g. dynamometer test unit 111 when connected to the vehicle 100 to be tested. During testing, an output shaft 202 of the test unit 111 is arranged to be rigidly connected to the wheel shaft 104 of the vehicle 100 (similarly, the output shaft of the test unit 110 is arranged to be rigidly connected to the wheel shaft 103). This is schematically indicated in FIG. 1 and illustrated more in detail in FIG. 2. The rigid connection is accomplished by removing the vehicle wheel and attaching the output shaft 202 of the dynamometer test unit to the wheel hub 203 directly or, as in the present example, using an adapter plate 204, so as to obtain a rigid connection between vehicle 100 and dynamometer test unit 111 in a simple manner. The adapter plate 204 may be adapted to fit the wheel-carrying end of the half shaft 104 of the vehicle 100 and to be secured by fasteners in place of the rim of the wheel.

The adapter plate 204 is further fixedly connected to the output shaft 202 of the dynamometer test unit 111. This can be accomplished, for example, using a circular coupling flange 205 which e.g. can be welded to a clamped-on collar on the output shaft 202, or otherwise secured to the output shaft 202 of the dynamometer test unit 111. The adapter plate 204 is rigidly but releasably secured by means of fasteners such as bolts to the coupling flange 205. The adapter plate 204 may further be arranged to be axially aligned with the coupling flange 205 so that the half shaft 104 thereby also is aligned or substantially aligned with output shaft 202, the output shaft 202 and half shaft 104 thereby being rotationally locked to each other. The rigid connection has, inter alia, the advantage that rotational speed of the wheel shaft can be measured by a suitable sensor measuring rotational speed of the output shaft 202 of the electrical machine 201.

The dynamometer test units 110, 111, which e.g. can be standing freely on a floor 230, are thus connected to the vehicle only by means of a (rigid) coupling to the wheel shafts (wheel hubs) (and possibly some kind of electronic wire connection for communication with the vehicle control system), and are also supporting, i.e. carrying the weight of the vehicle in place of the wheel that has been taken off.

According to the illustrated embodiment, the test unit 111 comprises a power source in the form of an electrical machine 218. The use of an electrical machine as power source in the dynamometer test unit may be advantageous since it is capable both to absorb torque applied by e.g. an internal combustion engine, and to also apply torque e.g. to be absorbed by an electrical machine of the vehicle, e.g. to test regenerative braking. However, according to embodiments of the invention, the dynamometer test unit can also be realized with other types of power-absorbing means, such as e.g. a hydrostatic pump assembly, or a combination of one or more electrical machines and one or more hydrostatic pump assemblies.

The electrical machine 218 comprises, in a manner known per se, a stator encompassed by and secured in a stator housing 220, and a rotor mounted for rotation in the stator. The output shaft of the electrical machine 218 may form the output shaft 202 of the dynamometer test unit 111 or the output shaft 202 of the dynamometer test unit 111 may be firmly secured to and axially aligned with the output shaft of the electrical machine 218 to connect wheel shaft and rotor of the electrical machine.

As can be seen from FIG. 2, the dynamometer test units 110, 111 are further resting on the floor 230 through a support structure 207 comprising, in the present example a frame and wheels 210, 211 which may facilitate maneuvering of the dynamometer test units 110, 111, e.g. to position them in relation to the vehicle/wheel shaft to be tested.

The support structure 207, in the following denoted stator support, is configured to supporting the stator of the electrical machine, and thereby the electrical machine all together, and carry the torque that during is testing is applied to the dynamometer test unit 111 by the vehicle wheel shaft 104 when power is applied by a vehicle power source such as the internal combustion engine according to the present example and the electrical machine 218.

The stator support 207 hence carries the weight of the electrical machine 218, and other elements attached thereto, such as, according to the present example, a cooling fan 225 for cooling of the electrical machine 218 and being driven by an electric motor 226.

As is schematically indicated in FIG. 2, the stator, and thereby the complete electrical machine 218 assembly, is only supported towards the end of the dynamometer test unit that during testing is configured to face the vehicle 100. The manner in which stator and thereby electrical machine 218 is attached to the stator support is illustrated in FIG. 3.

Figure 3:
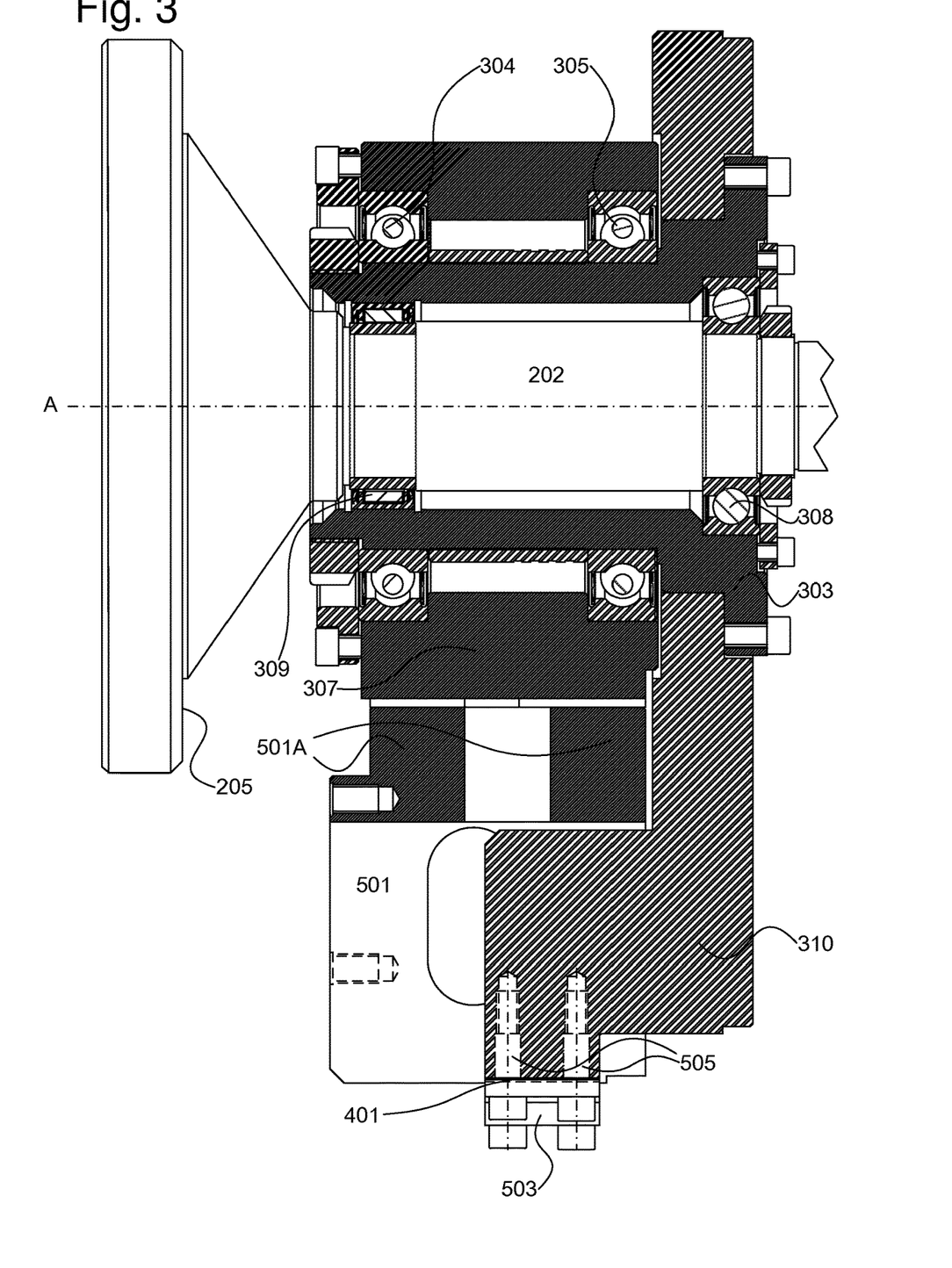
FIG. 3 illustrates a lateral view, in axial section, of a portion of the dynamometer test unit in FIG. 2 more in detail.

FIG. 3 illustrates a portion of the end of the dynamometer test unit 111 that during testing faces the vehicle to be tested and which to a large extent is hidden in FIG. 2. FIG. 3 illustrates a lateral view of a vertical section along axis B in FIG. 2 in a vertical plane intersecting the axis A of the dynamometer output shaft 202.

FIG. 3 further shows the coupling flange 205 which in FIG. 2 is connected to the vehicle wheel hub 203 through adapter plate 204. As was mentioned above, the coupling flange 205 may be e.g. be welded or bolted to a collar (not shown) clamped-on to the output shaft 202.

The end of the stator facing the vehicle during testing, represented by stator housing 220, and from which the output shaft 202 of the electrical machine/dynamometer test unit extends, comprises a tubular extension, or collar 303, by which the stator 220, and hence the complete assembly, including the electrical machine 218 and identified by dashed lines 228 in FIG. 2, and partly being obscured from view by coupling box 229, is journaled for rotational movement coaxially with the dynamometer output shaft 202 through a bearing housing 307 comprising a pair of anti-friction bearings 304, 305. The electrical machine 218 is hence rotatably journaled in relation to the stator support 207, and carried completely by the stator support 207 through the bearings 304, 305. The electrical machine 218 hence projects in cantilever fashion from, and carried by, the bearings 304, 305. Hence, a major portion of the dynamometer test unit 111 projects in cantilever fashion from the bearing housing 307, thereby giving rise to a substantial bending moment. The bearing housing 307 may therefore, for example, comprise bearings 304, 305 of the kind used as wheel bearings in trucks, or other suitably dimensioned bearings being capable to accommodate the load imposed by the electrical machine 218.

The dynamometer test unit 111 output shaft 202, in turn, is journaled to rotate freely within the stator housing collar 303 through bearings 308, 309. Consequently, the dynamometer test unit output shaft 202 rotates freely in relation to the stator housing which in turn is rotatably journaled in relation to the stator support 207.

The stator support 207 comprises a rigid ground engaging support which generally serves both the purpose of carrying the weight of the elements of the dynamometer test unit supported thereby as well as a portion of the weight of the car being tested in place of the vehicle wheel being removed during testing. During the testing, the stator support 207 thus carries a major portion of the weight of the test unit 111 and a substantial portion of the weight of the vehicle 100. The ground engaging support prevents the dynamometer test unit from rotating when the dynamometer test unit is subjected to torque. The ground engaging support may take various designs and comprises, according to the illustrated example, a pair of spaced apart legs 131, 132 (see FIG. 1) which are provided with the support wheels 211. A further leg 240, with associated wheel 210, prevents the dynamometer test unit 111 from tilting backwards when disconnected from the vehicle 100.

Furthermore, the support wheels 211, 210 permit the vehicle 100 and the test unit 111 to move laterally without any appreciable forces being thereby applied to the test unit. Moreover, the support wheels 211, 210 facilitate the handling of the test unit 111 so that the test unit 111 can conveniently be moved towards and away from the vehicle.

An object of the present invention is to measure the torque that the dynamometer test unit/stator support is subjected to during testing of a vehicle. The means for measuring the torque applied to the stator support 207 comprises an elastic steel strip, which may be made from high-strength steel of uniform width, and which when firmly secured to the dynamometer test unit is subjected to a tensile prestress. Torque is measured by measuring the strain that the strip undergoes when it is subjected to a force caused by the torque. The force, and thereby torque, may then be determined.

Figure 4A:
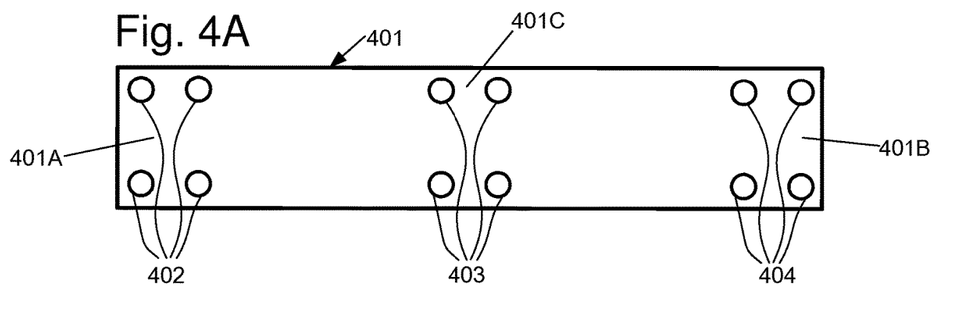
FIG. 4 illustrates an elastic strip comprising a strain gauge arrangement according to embodiments of the invention.

An example of an elastic strip 401 according to embodiments of the invention is illustrated in FIG. 4A. The strip is elongated and provided, according to the present non-limiting example, with three groups of holes 402-404 to be used when fastening the strip to the stator and stator support.

Figure 5:
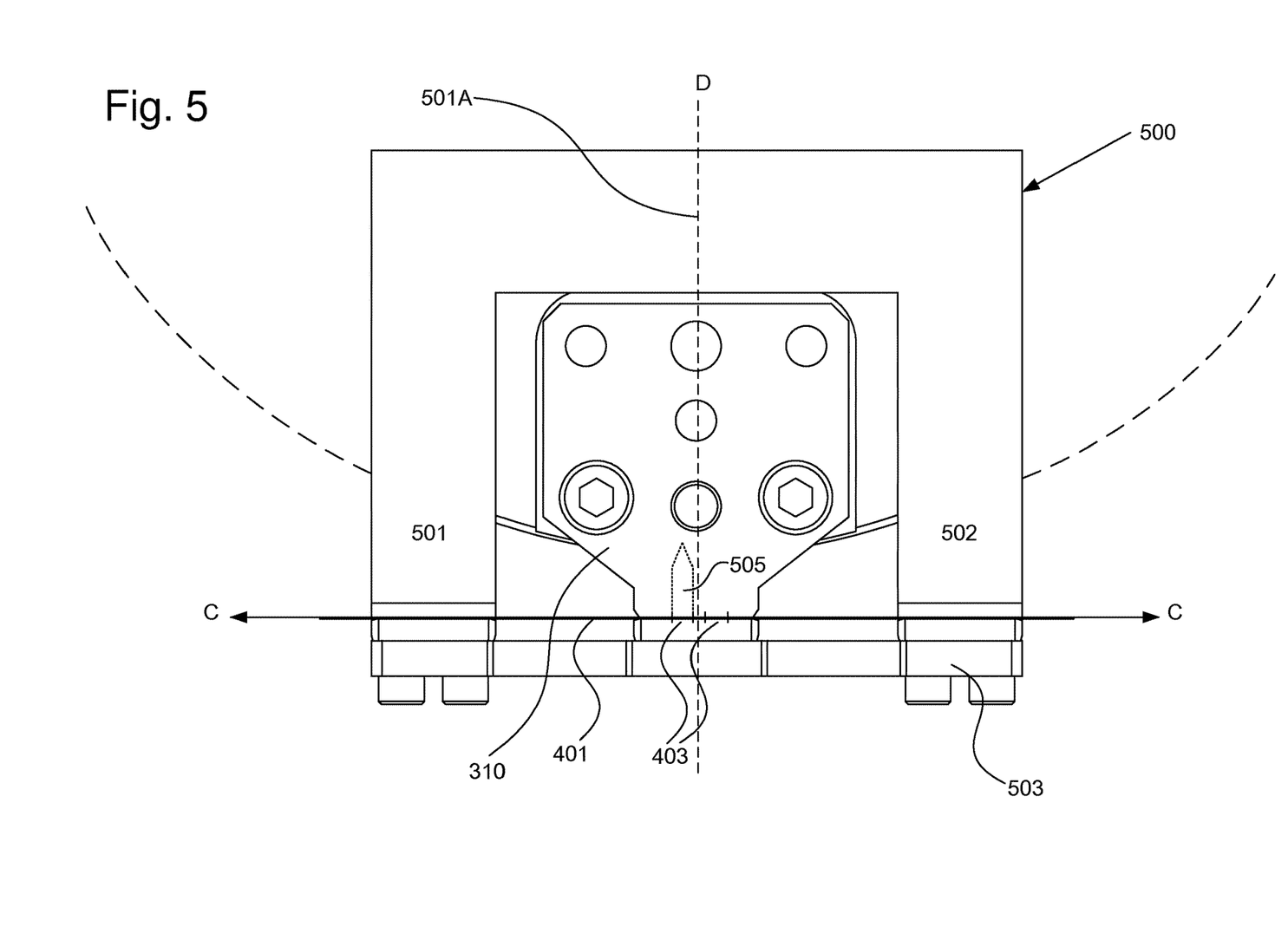
FIG. 5 is a portion of the dynamometer test unit seen from the left in FIG. 2.

FIG. 5 illustrates the strip being properly installed in the dynamometer test unit. FIG. 5 shows an enlarged portion of the dynamometer test unit as seen from the left in FIG. 2, where the section in FIG. 2 is taken along axis D in FIG. 5. The stator, via the stator housing, comprises a lug 310, also shown in FIG. 3, which rotates with the stator and hence is rotatable in relation to the stator support according to the above. Furthermore, the stator support comprises a generally U-shaped structure 500 comprising lugs 501, 502. According to the present example, the ends 401A, 401B of the strip 401 are firmly clamped to the lugs 501, 502 e.g. trough suitable fastening means such as screws or bolts. The structure 500 forms an integral part of, or is firmly secured to, the stator support 207.

Furthermore. the central portion 401C of the strip 401 is firmly secured to the stator lug 310 by holes 403 and suitable fastening means such as e.g. screws/bolts and corresponding holes 505 in the stator lug 310. The strip is also indicated in FIG. 3. In this way, the strip 401 forms a link between the electrical machine and the stator support 207, which transmits tensile forces between the stator support and the stator which would otherwise be free to rotate relative to each other with very low frictional resistance through bearing housing 307 if the strip 401 were absent. The amount of relative rotational movement that is permitted when the strip 401 is attached is determined by the elongation of the strip caused by the transmitted tensile force. Since the strip is formed by high-strength steel the relative motion is small but measurable according to the below. When torque is applied to the stator during testing of a vehicle, this will be transmitted to the stator support through the strip 401, where the torque may be measured by measuring the strain that the strip undergoes when being subjected to the torque. The rigidity/stiffness of the system may be further increased by a steel bar 503 being firmly secured to the stator support lugs following attachment of the strip.

According to embodiments of the invention, the strip 401, during attachment to the stator lugs 501, 502, is subjected to a homogenous tensile stress in the longitudinal direction C. The strip 401 may, for example, be secured to one of the stator lugs 501, 502 to then be subjected to tensile stress in the longitudinal direction prior to, and in particular while, being secured to the other of the stator lugs 501, 502. In this way, the strip 401 will be prestressed already while being attached to the stator lugs, and hence when attached be subjected to a homogenous tensile stress in the longitudinal direction of the strip.

This establishment of a homogenous prestress is advantageous and provides an arrangement where e.g. variations in temperature when performing the tests can be accounted for in a straight-forward manner. For example, it may be desirable to perform vehicle tests both in relatively high temperatures as well as temperatures well below zero. The homogeneous prestress may at least to a great extent eliminate temperature dependencies in the torque measurement results. For example, the temperature dependencies can be accounted for in a straight-forward manner by taking the expansion coefficient into consideration when determining the resulting force/torque from the strain that the strip undergoes when subjected to force. In case the tensile stress in not homogeneous, different portions of the strip will react differently to temperature variations in dependence of the prevailing stress at a particular point, with the result that uncertainties may result in the measurement result for other temperatures than for the temperature for which torque measurement has been calibrated.

A more obvious and straight-forward method for subjecting e.g. an elongated strip to a tensile stress is to firmly secure the strip at both ends while being in a stress relieved state. Thereafter the strip is subjected to tensile stress through lateral displacement e.g. of a central portion of the strip. According to the present example, this could be easily accomplished by the stator lug being offset e.g. 1.5-2 mm in the lateral direction. Although solutions this kind generally provide sufficient measurement accuracy when tests are performed in essentially similar conditions e.g. in regard of temperature as prevailed during assembly of the dynamometer test unit, designs of this kind may lose accuracy when the ambient temperature deviates from such conditions due to inhomogeneities in stress for different portions of the strip, in particular where it bends.

Figure 6:
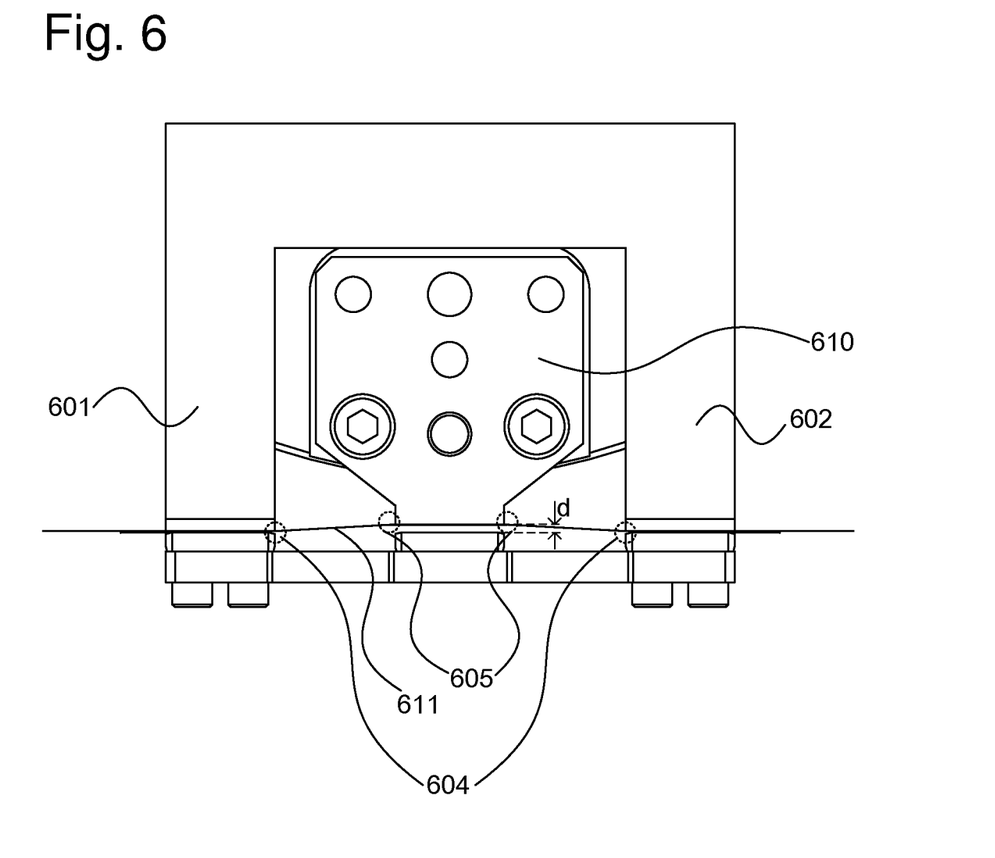
FIG. 6 illustrates non-homogenous prestress of a measurement strip.

This is schematically illustrated in FIG. 6, which illustrates an exemplary attachment of a strip 611 between stator support and stator lug 610. In FIG. 6, the strip has been secured to the stator support lugs 601, 602 while being relieved from tensile stress to thereafter be subjected to tensile stress by the center portion being affixed to the stator lug 610 which is displaced in the transversal direction by a suitable distance d being such that the transversal displacement when the strip is affixed to the stator lug 610 subjects the strip to a tensile prestress. Although designs of this kind, as was mentioned, may provide adequate measurement results, there exist situations when measurement results may not be completely satisfactory.

This is due to the bends that the strip is subjected to when being prestressed. As can be seen in FIG. 6 these bends occur both where the strip leaves stator support lugs, indicated by circles 604 and also where it leaves the stator lug, indicated by circles 605. The tensile stress that the strip 611 is subjected to is particularly high at these bends. Furthermore, when the strip, prestressed in this different, non-homogenous manner, is subjected to variations in the conditions in which tests are to be performed, for example with regard to ambient temperature, the thermal expansion (or negative thermal expansion/contraction as the case may be) will be non-uniform in particular at these bends, which thereby may render variations in the resulting tensile prestress that are difficult to predict thereby imposing uncertainty in the measurement result obtained by torque transducer.

Still, the prestress is required in order to be able to perform torque measurements, since otherwise the strip would buckle when being subjected to torque, thereby rendering representative measurements impossible.

Problems of this kind are alleviated by instead subjecting the strip to a tensile prestress in the longitudinal direction according to the invention to thereby obtain a homogenous prestress in the strip.

In regard of the level to which the prestress is carried out, the tensile force prestressing the strip 401 may be controlled to a level that is at least slightly greater than the greatest tensile force the strip has to transmit between the stator and the stator support in operation. In other words, the tensile prestress should be sufficient to ensure that the strip is always prestressed in tension during operation of the test unit also when subjected to the maximum torque that the dynamometer is designed to absorb.

The prestress may also be controlled e.g. to half the yield point (elastic limit), i.e. is the point on a stress-strain curve that indicates the limit to which the tensile stress exhibits elastic behavior. If further stress is applied beyond this point plastic behavior begins, i.e. permanent deformation will occur, and the material no longer returns to original shape when the applied stress is removed.

According to embodiments of the invention, the strip is prestressed to half, or approximately half, the proportionality limit. Up to this point stress is proportional to strain and the stress-strain graph up to this point essentially is represented by a straight line. The proportionality limit is lower than the yield point. It is preferable to conduct torque measurements on the proportional portion of the stress-strain curve, since otherwise the force strain relation may be difficult or impossible to determine.

The prestress may also e.g. be set to approximately the center of the proportional portion of the stress-strain curve. The prestress may e.g. also be set to a level on the stress-strain curve being offset from the bottom of the proportional portion by a stress corresponding to the stress that the strip will be subjected to when subjected to maximum torque.

Preferably the strip is prestressed to a stress level where can be ensured that plastic deformation will not occur by never exceeding the elastic limit, while the level simultaneously is sufficiently high so that the strip will never be relieved from stress to an extent where it may buckle or leave a proportional area of the stress-strain curve when subjected to torques for which the dynamometer test unit is designed.

Figure 4B:
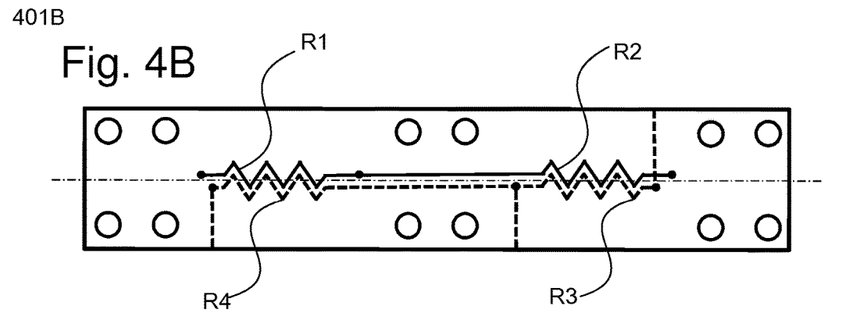
Figure 4C:
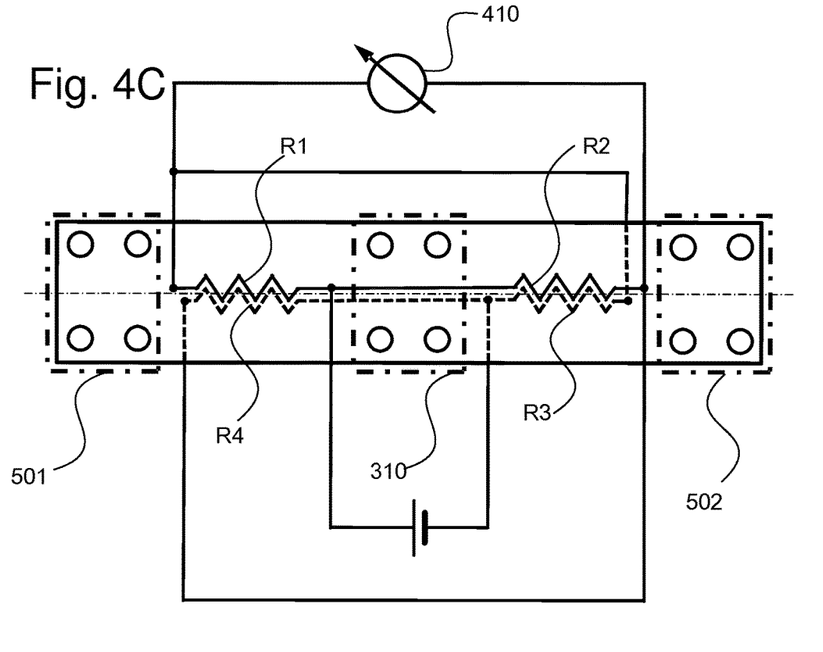

As was mentioned, torque is measured by measuring the strain that the strip undergoes when subjected to torque. The strain, when in the proportional region discussed above, is proportional to the force the strip is subjected to which in turn is proportional to the torque. In this way torque can be determined in a straight forward manner, and measurement of the strain may be accomplished by at least one strain gauge element being secured in well-known manner to each of the two sections of the strip 401, i.e. being positioned between the stator lug 310, on the one hand, and each of the stator support lugs 501,502, on the other hand. The strain gauges are illustrated in FIG. 4B, where four strain gauge elements, two on either side, are provided and which are shown as resistors R1, R2, R3, R4. forming the branches of a Wheatstone bridge circuit in well-known manner. The strain gauge elements R1-R4 are positioned near the longitudinal center line of the strip 401, the strain gauge elements R1 and R4 being positioned on the strip section on one side of the stator lug 310 and the strain gauge elements R2 and R3 being positioned on the strip section on the other side of the stator lug. Furthermore, elements R1, R2 are on the upper side of the strip 401 as seen in FIG. 5, and elements R3, R4 on the underside When a force is transmitted from the stator to the stator support, the tensile stress of the strip 401 will increase on one side of the stator lug 310 and decrease on the other side of the stator lug. As a consequence, the resistance of one pair, e.g. R1, R4, of strain gauge elements will be changed in one sense, e.g. increase, while the resistance of the other pair, R2, R3, will be changed in the opposite sense, e.g. decrease. The connections are illustrated in FIG. 4C, and the resulting imbalance of the bridge is measured in well-known manner at point 410 and the measured value is used for the determination of the magnitude of the transmitted force, which is proportional to the torque reaction between the stator and the stator support.

Moreover, because of the constant prestress, there is no play or friction in the connection between the stator and the stator support formed by the strip.

According to embodiments of the invention, the strain gauge may also be used to ensure that precisely the desired tensile prestress is also obtained. When the strip 401 has been secured at one end to a stator support lug, e.g. lug 501, the strain, and thereby tensile stress, may be measured using the strain gauges as the strip is subjected to tensile stress before and while being firmly secured to the stator support lug 502. When it is determined that the desired level of tensile prestress has been reached e.g. through the use of a suitable tool stretching the strip, the yet lose end of the strip can be firmly secured to the support lug 502. In this way the desired prestress is obtained and in a manner where the prestress is homogeneous through the strip. The strip may then be firmly secured to stator lug 310 without need for any transversal play so that the strip is homogenously prestressed.

Furthermore, two or more strips may be used in parallel, e.g. to increase the maximum torque that the dynamometer test unit may be subjected to, each strip being homogenously prestressed, and one or more or all utilized strips being provided with the strain gauges.

Finally, according to the above described example, each dynamometer test unit comprises a single power source consisting of an electrical machine. However, as was indicated above, according to embodiments of the invention, the dynamometer test unit may comprise two or more individually controllable power sources, which can be electrical machines, hydraulic pumps or any suitable combination thereof.

Above, the present invention has been exemplified in connection with testing of a particular kind of vehicle. Naturally, the present invention is applicable for testing of any kind of vehicle, such as a conventional two or four-wheel drive combustion engine vehicle, or any other kind of hybrid vehicle other than what has been disclosed above, for as long that at least one of the tested wheel shafts are used for changing steering direction of the vehicle. Consequently, more than two dynamometer test units can be used for being connected to more than two wheels, and it is also contemplated that only one wheel shaft is connected to a dynamometer test unit.

Furthermore, torque measurement of this kind measures a reaction torque. This means that the measured torque includes influences of moment of inertia of the electrical machine. The accuracy of the measurements, in particular during acceleration and deceleration of the shaft to which the dynamometer is connected may be increased by compensating the measurement result with the synchronous influence that the moment of inertia of the dynamometer test unit power source has on the measurement result. If two or more power sources are used for a single dynamometer test unit, the moment of inertia can be separately determined for the power sources so that only moment of inertia (power sources) currently participating in the measurements are used when compensating the results.

As is apparent from the above, the term power source means a power source that is capable of subjecting a wheel shaft to a power (torque), be it a propelling (positive) torque or braking (negative) torque or a combination of both.

Furthermore, during testing, the angle of rotation of the dynamometer output shaft 202, and hence wheel shaft 104, may be determined. For example, the angle of rotation can be determined using suitable shaft position determining means as mentioned above.

The torque may be measured using a strip according to the above, e.g. at a high sampling rate, such as e.g. 100-100 000 times a second. The determined torque may then be correlated with the current rotation angle of the dynamometer output shaft/wheel shaft, and the correlated values may then be utilized e.g. to determine whether certain shaft angles of rotation give rise to divergent torque measurements. In this way, anomalies may be detected, e.g. caused by the dynamometer test unit not being set up properly, or caused by other causes such as vehicle internal imbalances. The correlation of angle of rotation of the shaft with corresponding torque measurement may be utilized to detect such anomalies.

Figure 7:
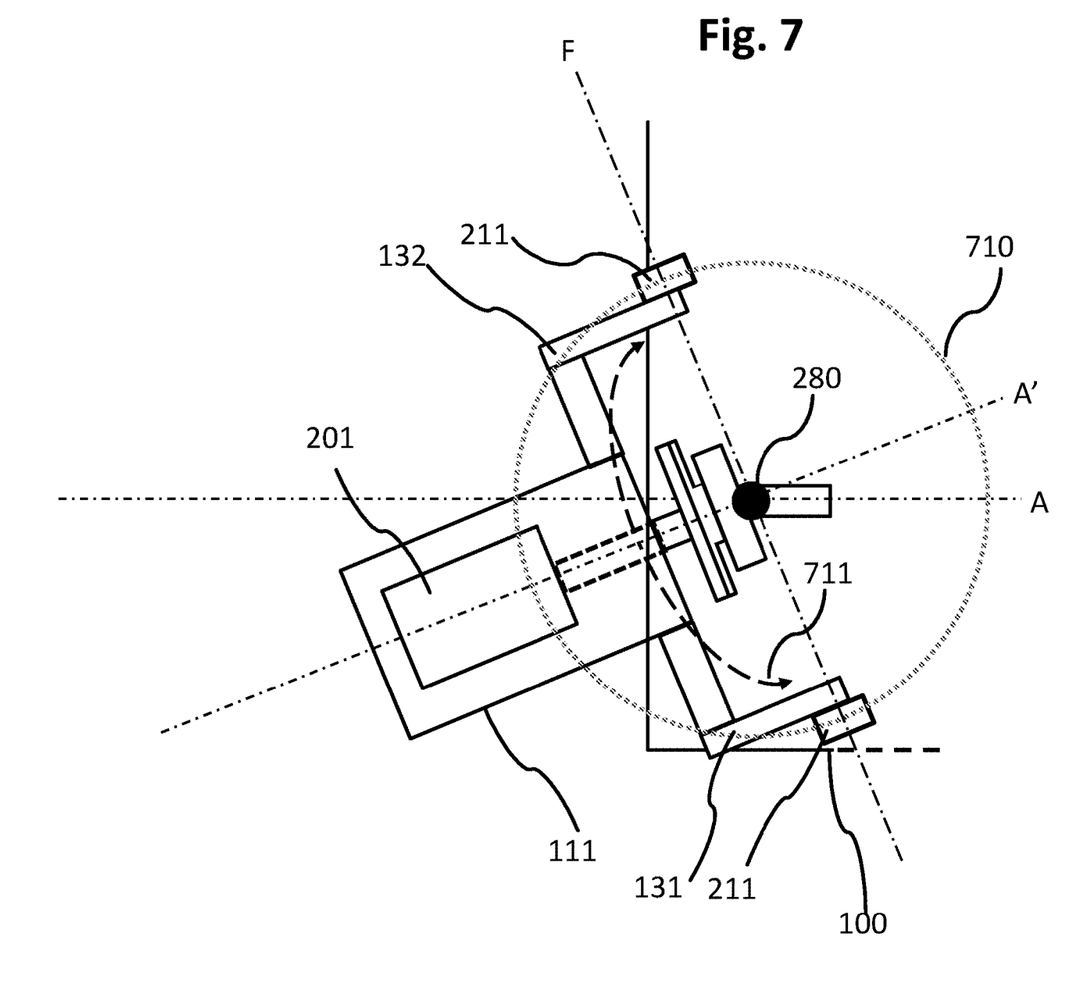

Furthermore, as was mentioned above, there may exist a desire to measure the yaw moment, i.e. torque, that the dynamometer test unit is subjected to when being subjected to a turning motion about the yaw axis, i.e. a substantially vertical axis. FIG. 7 illustrates an example of a turning motion of this kind.

FIG. 7 discloses the dynamometer test unit 111 of FIG. 1, which hence is connected to the vehicle only by means of a (rigid) coupling to the wheel shaft (wheel hub) (and possibly some kind of electronic wire connection for communication with the vehicle control system), and is also supporting, i.e. carrying the weight of the vehicle in place of the wheel that has been taken off.

Testing of vehicles may be performed without changing steering angle of the vehicle, but, as was mentioned above, there may also be situations where it is desired to perform wheel steering angle changes during testing. Oftentimes vehicles are provided e.g. with anti-skidding systems or similar functionality, and/or automatic parking functionality, and/or swiveling curve lights that at least to some extent follows the steering angle of the wheels and/or various other possible kinds of systems that are influenced by or that influences the vehicle steering angle during operation.

If a steering angle change is applied to the front wheel shafts e.g. by turning the steering wheel of the vehicle 100, this will turn the wheel hub 203 and wheel when attached. In this case, the rigid connection between the dynamometer test unit 111 and wheel shaft 104 will cause the dynamometer test unit 111 to be subjected to a rotating motion to follow the change in steering angle of the wheel hub.

This turning motion will occur about a relatively vertical axis, indicated by "E" in FIG. 2, e.g. defined by the axis passing through the center of the upper support 290 of the spring strut and joint 291 of the kingpin/steering knuckle/steering spindle allowing turning of the wheel hub 203.

This joint is schematically indicated from above by 280 in FIG. 1. A turning motion of the wheel hub, e.g. to simulate a steering angle change, will therefore result in a relocation of the dynamometer test unit 111 on the floor upon which it is resting as the test unit 111 is rotated about the center of rotation defined by axis E. An exemplary resulting relocation (rotation) of the dynamometer test unit 111 caused by being rotated following turning of the wheel hub is hence illustrated in FIG. 7, where the dynamometer test unit 111 has been rotated about the center of rotation 280 from a position represented by axis A by an angle represented by the angle between axis A and axis A'.

The possibility of allowing maneuverability of the dynamometer test units in this manner may hence provide additional possibilities when testing the vehicle since vehicle systems being influenced by vehicle steering angle may also be tested, such as when the vehicle steering mechanism performs a wheel hub turning motion, e.g. by the vehicle steering wheel being turned to thereby turn the dynamometer test unit instead of a vehicle wheel.

As was mentioned, during the movement the dynamometer test unit is subjected to a yaw moment and according to embodiments of the invention a strip of essentially the illustrated kind may be utilized also for determining the yam moment.

In this case, in addition to measuring strain in a longitudinal direction as discussed above, the strip, such as the strip of FIG. 4A-C, may include strain gauge elements being arranged in the transversal direction, e.g. arranged perpendicular to the strain gauge elements R1-R4 illustrated in FIG. 4A-C, or at least at an angle with respect to the strain gauge elements R1-R4.

Similar to what has been described with regard to torque measurements above, a turning motion of the dynamometer test unit giving rise to a yaw moment which will have the result that the strip will be subjected to different levels of stress in the transversal direction on either side of strip attachment to the stator lug 310. Using the additional transversal strain gauges, the transversal strain resulting from this stress may be measured, where the yaw moment may be determined from this strain, and possibly also using in addition the strain detected by strain gauges R1-R4.

According to embodiments of the invention, a torque measurement device may be provided also in the bearing housing 307, and in particular being arranged to measure the bending moment that one, or both of, the antifriction bearings 304, 305 are subjected to when the dynamometer test unit is turned e.g. by the vehicle steering mechanism. The bending moment that the bearings are subjected to may then be utilized to determine the yaw moment that the dynamometer test unit is subjected to.

Finally, it should be understood that the present invention is not limited to the embodiments described above, but relates to and incorporates all embodiments within the scope of the appended independent claims. For example, other designs for connecting the stator support to the stator using the strip are contemplated, e.g. by the ends of the strip being attached to the stator and a portion in between being attached to the stator support.

The invention claimed is:

1. Dynamometer test unit configured for use in a vehicle dynamometer system for dynamometer testing of a vehicle, the dynamometer test unit being configured to be connected to a wheel shaft of a vehicle, the dynamometer test unit comprising a power source having a stator and a rotor and being configured to, during testing, apply torque to a wheel shaft of the vehicle being tested, the power source being carried by a stator support, the stator being journaled in relation to the stator support, wherein means for measuring torque comprise an elongated elastic strip, wherein the elongated elastic strip connects the stator to the stator support, thereby restraining relative rotational movement between stator and stator support, and configured to transfer force between the stator and stator support, the elastic strip being firmly secured in a manner such that it is subjected to homogenous tensile prestress in a longitudinal direction of the elastic strip.

2. Dynamometer test unit according to claim 1, wherein the elastic strip is subjected to tensile prestress in the longitudinal direction of the elastic strip in a manner such that the elongated elastic strip is subjected to tensile prestress also when firmly secured to the stator support but released from the stator, or vice versa.

3. Dynamometer test unit according to claim 1, wherein both ends of the elongated elastic strip being firmly secured to either of the stator or stator support, and wherein a portion in between the ends of the elongated elastic strip is firmly secured to the other of the stator or stator support, wherein the elastic strip is firmly secured such that the elongated elastic strip is subjected to tensile prestress in the longitudinal direction also when the portion in between the ends is released from the other of the stator or stator support.

4. Dynamometer test unit according to claim 1, wherein the dynamometer test unit being designed to, during testing, absorb at most a first predetermined torque, the elongated elastic strip being subjected to a tensile prestress at least corresponding to the stress the elongated elastic strip being subjected to when said dynamometer test unit absorbs said first predetermined torque.

5. Dynamometer test unit according to claim 1, wherein both ends of the elongated elastic strip are firmly secured to the stator support, and wherein a center portion of the elongated elastic strip is firmly secured to the stator.

6. Dynamometer test unit according to claim 1, wherein the elongated elastic strip is prestressed under the action of a force acting in the longitudinal direction of the strip accomplished by the strip during assembly being secured at one end to the stator or stator support and subjected to said force while the other end being secured to said stator or stator support.

7. Dynamometer test unit according to claim 1, wherein the torque measuring means further comprising at least one pair of strain gauges secured to the elongated elastic strip, the strain being measured by measuring a relative difference in resistance caused by strain of the strip while the dynamometer test unit is subjected to torque.

8. Dynamometer test unit according to claim 1, further comprising the end portions of the strip being firmly secured to either one of the stator and stator support and its central portion being firmly secured to the other of the stator and stator support, and a first pair of strain gauges being secured to the elongated elastic strip on one side of the central strip portion and a second pair of strain gauges being secured to the elongated elastic strip on the other side of the central strip portion, the strain gauges being connected in an electrical measuring bridge circuit and the force acting on the elongated elastic strip being measured by measuring a relative difference in resistance caused by strain of the strip while torque is applied to the dynamometer test unit.

9. Dynamometer test unit according to claim 8, further comprising a third pair of strain gauges being secured to the elongated elastic strip on the side of the central strip portion comprising the first pair of strain gauges and being arranged at an angle with respect to the first pair of strain a second pair of strain gauges, and a fourth pair of strain gauges being secured to the strip on the side of the central strip portion comprising the second pair of strain gauges and being arranged at an angle with respect to the second pair of strain gauges, the strain gauges of the third and fourth pair being connected in an electrical measuring bridge circuit and the force acting on the strip being measured by measuring a relative difference in resistance caused by strain of the elongated elastic strip while torque is applied to the dynamometer test unit.

10. Dynamometer test unit according to claim 1, wherein the stator is supported by the stator support by a tubular stator member being journaled for rotational movement relative to the stator support by a bearing assembly comprising at least two antifriction bearings, wherein the dynamometer test unit output shaft is journaled for rotation relative the stator on antifriction bearings within and concentrically with the tubular stator member.

11. Dynamometer test unit according to claim 10, further comprising the bearing assembly being arranged at or towards the end of the stator support being configured to connect to a wheel shaft during testing, and wherein the greater portion of the power source extend in cantilever fashion from the bearing assembly towards the opposite side of the stator support while being carried by the bearing assembly.

12. Dynamometer test unit according to claim 1, wherein the stator support comprises a ground engaging support preventing the dynamometer test unit from rotating when subjected to torque.

13. Dynamometer test unit according to claim 1, wherein the dynamometer test unit is arranged to be standing freely on a surface and connected to the vehicle by means of a rigid coupling to the wheel shaft, while supporting the weight of the vehicle by means of said rigid coupling.

14. Vehicle dynamometer system for dynamometer testing of a vehicle comprising at least one dynamometer test unit according to claim 1.

15. Vehicle dynamometer system according to claim 14, further comprising measuring, when measuring a torque:
determining a first measure of a first reaction torque of said first dynamometer power source,
determining an influence of moment of inertia on said first measure of said first reaction torque, and
compensating said first measure of said first reaction torque by said determined influence of moment of inertia.

16. Vehicle dynamometer system according to claim 14, wherein:
the vehicle dynamometer system is configured to determine torque values a plurality of times for each revolution of the dynamometer test unit output shaft, and
the vehicle dynamometer system comprising means for correlating the determined torque values with corresponding angles of rotation of the dynamometer output shaft and/or wheel shaft.

17. Vehicle dynamometer system a claim 1, wherein:
the vehicle dynamometer system is configured to measure the torque that the dynamometer test unit is subjected to when undergoing a turning motion about a substantially vertical axis when being attached to a vehicle being tested.

18. Assembly method for assembling a dynamometer test unit configured for use in a vehicle dynamometer system for dynamometer testing of a vehicle, the dynamometer test unit being configured to be connected to a wheel shaft of a vehicle, the dynamometer test unit comprising a power source having a stator and a rotor and being configured to, during testing, apply torque to a wheel shaft of the vehicle being tested, the power source being carried by a stator support, the stator being journaled in relation to the stator support, wherein means for measuring torque comprise an elongated elastic strip, wherein the elongated elastic strip connects the stator to the stator support, thereby restraining relative rotational movement between stator and stator support, and configured to transfer force between the stator and stator support, the elongated elastic strip being firmly secured by one end to one of the stator and the stator support, wherein following attachment of the first end, the second end is attached to said one of the stator or stator support while being subjected to tensile stress in the longitudinal direction so that thereby the firmly secured elongated elastic strip is subjected to homogenous tensile prestress in the longitudinal direction of the elongated elastic strip.

19. Assembly method according to claim 18, the elongated elastic strip further comprising at least one pair of strain gauges secured to the elongated elastic strip, the strain being measured by measuring a relative difference in resistance caused by strain of the elongated elastic strip while the dynamometer test unit is subjected to torque, the assembly method further including:
measuring the tensile stress of the elongated elastic strip using said strain gauges while being subjected thereto to thereby ascertain a predetermined tensile prestress while being firmly secured.

\* \* \* \* \*